United States Patent
Chen et al.

(10) Patent No.: US 11,607,733 B2
(45) Date of Patent: Mar. 21, 2023

(54) BULK GRAIN BOUNDARY MATERIALS

(71) Applicant: BROWN UNIVERSITY, Providence, RI (US)

(72) Inventors: Ou Chen, Barrington, RI (US); Yasutaka Nagaoka, Providence, RI (US)

(73) Assignee: BROWN UNIVERSITY, Providence, RI (US)

( * ) Notice: Subject to any disclaimer, the term of this patent is extended or adjusted under 35 U.S.C. 154(b) by 43 days.

(21) Appl. No.: 17/124,025

(22) Filed: Dec. 16, 2020

(65) Prior Publication Data
US 2022/0016706 A1    Jan. 20, 2022

Related U.S. Application Data

(60) Provisional application No. 62/948,620, filed on Dec. 16, 2019.

(51) Int. Cl.
| | | |
|---|---|---|
| *B22F 9/16* | (2006.01) | |
| *B22F 1/054* | (2022.01) | |
| *B82Y 30/00* | (2011.01) | |
| *B82Y 40/00* | (2011.01) | |

(52) U.S. Cl.
CPC ............... *B22F 9/16* (2013.01); *B22F 1/054* (2022.01); *B22F 2301/25* (2013.01); *B82Y 30/00* (2013.01); *B82Y 40/00* (2013.01)

(58) Field of Classification Search
None
See application file for complete search history.

(56) References Cited

U.S. PATENT DOCUMENTS

| | | | |
|---|---|---|---|
| RE39,196 E | 7/2006 | Ying et al. | |
| 7,785,657 B2 | 8/2010 | LoCascio et al. | |
| 8,865,995 B2 | 10/2014 | Zhifeng et al. | |
| 9,190,179 B2 | 11/2015 | Yang et al. | |
| 2009/0152664 A1* | 6/2009 | Klem | H01L 27/14603 257/466 |
| 2012/0104325 A1 | 5/2012 | Talapin et al. | |
| 2014/0050851 A1 | 2/2014 | Kagan et al. | |
| 2014/0346442 A1* | 11/2014 | Nag | B82Y 10/00 257/29 |
| 2018/0273844 A1 | 9/2018 | Deshpande et al. | |

(Continued)

FOREIGN PATENT DOCUMENTS

| | | |
|---|---|---|
| CN | 103646777 A | 3/2014 |
| CN | 105503178 B | 4/2016 |
| CN | 106929764 B | 7/2017 |

(Continued)

OTHER PUBLICATIONS

Nagaoka et al., "Bulk Grain-Boundary Materials from Nanocrystals" Chem 7, 509-525, Feb. 11, 2021.

(Continued)

*Primary Examiner* — George Wyszomierski
(74) *Attorney, Agent, or Firm* — Adler Pollock & Sheehan P.C.

(57) ABSTRACT

The present invention provides a process for making nanoparticle based bulk materials. Also provided is a single component metal nanoparticle based bulk glass material comprising less than about 1% by weight of ligand capped nanocrystals; and wherein the metal is palladium.

14 Claims, 6 Drawing Sheets

(56) References Cited

U.S. PATENT DOCUMENTS

2019/0032241 A1\* 1/2019 Novet .................. C01B 13/18
2020/0249570 A1\* 8/2020 Talapin ................ C01B 19/002

FOREIGN PATENT DOCUMENTS

| CN | 109897991 A | 6/2019 |
| --- | --- | --- |
| EP | 0572484 B1 | 12/1993 |
| EP | 0670916 A1 | 9/1995 |
| JP | 2696735 B2 | 1/1998 |
| WO | 2007004631 A1 | 1/2007 |

OTHER PUBLICATIONS

Shaw, S., "Bottom-up approach to fabricate nanostructured thin films from colloidal nanocrystal precursors" Date of publication: Jan. 2017 https://lib.dr.iastate.edu/etd/15419/.

Tanju, S., "Grain Boundary (GB) Studies in Nano- and Micro-Crystalline Materials:" "ProQuest Dissertations and Theses, Date of publication: Jan. 2011" https://ui.adsabs.harvard.edu/abs/2011PhDT........53T/abstract.

Fang et al., "Fabrication of transparent hydroxyapatite ceramics by ambient-pressure sintering", Materials Letters, vol. 23, Issues 1-3, Apr. 1995, pp. 147-151. https://www.sciencedirect.com/science/article/pii/0167577X9500016X.

Hellebusch, DJ. "Sintered CdTe nanocrystal films for optoelectronic applications and the sublimation of CdSe nanorods" (Doctoral dissertation University of California Berkeley). Date of publication: Jan. 2015. https://digitalassets.lib.berkeley.edu/etd/ucb/text/Hellebusch_berkeley_0028E_15761.pdf.

Wu et al., "Nanostructured Gold Architectures Formed through High Pressure-Driven Sintering of Spherical Nanoparticle Arrays" Journal of the American Chemical Society, Date of publication: Aug. 2010. https://pubs.acs.org/doi/abs/10.1021/ja105255d.

Murray et al., "Colloidal synthesis of nanocrystals and nanocrystal superattices" IBM J. Res. & Dev vol. 45 No. 1 Jan. 2011.

Yin et al., "Formation of hollow nanocrystals through the nanoscale Kirkendall effect" Science. Apr. 30, 2004;304(5671):711-4. doi: 10.1126/science.1096566.

Shahjamali et al., "Ag—Ag2S Hybrid Nanoprisms: Structural versus Plasmonic Evolution" ACS Nano. May 24, 2016;10(5):5362-73. doi: 10.1021/acsnano.6b01532. Epub May 5, 2016.

Wang et al., "Integrating in situ high pressure small and wide angle synchrotron x-ray scattering for exploiting new physics of nanoparticle supercrystals" Review of Scientific Instruments. vol. 81, Issue 9: 10.1063/1.3480558.

Podsiadlo et al., "The role of order, nanocrystal size, and capping ligands in the collective mechanical response of three-dimensional nanocrystal solids" J Am Chem Soc. Jul. 7, 2010;132(26):8953-60: doi: 10.1021/ja100464a.

Scoville et al., "Thermal conductivity reduction in SiGe alloys by the addition of nanophase particles" ScienceDirect Nanostructured Materials vol. 5, Issue 2, Feb. 1995, pp. 207-223.

Carcia et al., "Transparent ZnO thin-film transistor fabricated by rf magnetron sputtering" Applied Physics Letters vol. 82, No. Feb. 7, 17, 2003.

Cargnello et al.. Control of metal nanocrystal size reveals metal-support interface role for ceria catalysts. Science. Aug. 16, 2013;341(6147):771-3. doi: 10.1126/science.1240148. Epub Jul. 18, 2013. PMID: 23868919.

Ghosh et al., "Solvent and Ligand Effects on the Localized Surface Plasmon Resonance (LSPR) of Gold Colloids" J. Phys. Chem. B 2004, 108, 37, 13963-13971; Publication Date:Aug. 24, 2004; https://doi.org/10.1021/jp047021q.

\* cited by examiner

BULK GRAIN BOUNDARY MATERIALS

CROSS REFERENCE TO RELATED APPLICATIONS

This application claims priority from U.S. Provisional Patent Application No. 62/948,620 filed Dec. 16, 2019, the contents of which are incorporated herein in their entirety.

BACKGROUND OF THE INVENTION

A nanocrystal is a material particle having at least one dimension smaller than 100 nanometers, based on quantum dots (a nanoparticle) and composed of atoms in either a single- or poly-crystalline arrangement. The size of nanocrystals distinguishes them from larger crystals. For example, silicon nanocrystals can provide efficient light emission while bulk silicon does not and may be used for memory components.

Nanocrystalline metals and alloys have been receiving increased interest from many researchers because of their unique mechanical and functional properties. Nanocrystalline or nanostructured crystalline materials have opened a new horizon toward the generation of enhanced strength beyond the expectation from the Hall-Petch relationship for conventional polycrystalline structural materials with ordinary grain structure, and conventional grain size range. The much higher strength of nanocrystalline materials compared to ordinary polycrystals originates from the extensive interaction between grain boundaries and dislocations.

The unique bulk properties of existing nanocrystalline materials are known to be ascribed to the presence of extremely high-density grain boundaries and triple junctions. This is often associated with the nonequilibrium deformation of microstructures introduced by severe plastic deformation (SPD) with less thermal stability, excess structural defects and chemical composition by segregation to grain boundaries and interfaces. Since the introduction of the concept of grain boundary design and control an increasing number of researchers have been involved in the development of high-performance polycrystalline materials, including nanocrystalline or nanostructured materials.

Grain boundaries (GBs) are an essential factor for a range of chemical, physical and mechanical material properties, such as ductility, thermal and electric conductivity, and catalytic ability. GB engineering had been practiced long before it was supported by scientific evidence. For example, metalsmiths have used various techniques, including quench hardening and "striking while the iron is hot" to harden metals, and these processes now are known as GB strengthening or the Hall-Petch effect. From these primitive techniques, in more recent efforts, scientists have focused on developing systematic structure-property relationships that link GB conditions to improved material properties.

Grain-boundary engineering is pivotal to fully utilize the mechanical, electrical, and thermal transport properties of various materials. However, current methods in metallurgy rely almost exclusively on top-down approaches, making precise grain-boundary engineering, especially at nanoscale, difficult to achieve.

Current methods of GB engineering rely largely on 'top-down' approaches, such as electrodeposition, hammering, mechanical alloying, rapid cooling, 5 and sputtering. These methods do not allow the precise control of a material's GB configuration, posing a severe challenge for the advancement of GB materials in practical applications. In this regard, pressure sintering of nanocrystals (NCs) is an intriguing 'bottom-up' alternative to the topdown approaches. External pressure can fuse individual NCs while largely preserving their original crystal domains. However, in most previous efforts, adequate NC-sintering pressures (i.e., >10 GPa) were generated by diamond anvil cells, which severely limit the dimensions of the processable sample to hundreds of micrometers in lateral directions. Furthermore, pressure-sintering in diamond anvil cells has resulted in low-dimensional nanostructures, including nanorods, nanowires and nanoplatelets yet to be extended to bulk-size materials. Metal based nanocrystals generally have ligand caps associated with them. It is these ligand caps that hinder the dense packing of nanocrystals to form bulk materials with desired properties or to form amorphous powders or materials.

Given the increasing need for better grain boundaries, there still exists a need for processes that will help in making better packed bulk materials using nanoparticles.

SUMMARY OF THE INVENTION

The instant invention in one embodiment provides a process for making nanoparticle based bulk materials, said process comprising: (a) combining organic ligand associated nanocrystals in a non-polar solvent to form a first dispersion; (b) treating the first dispersion with a solution of an inorganic reagent in a polar solvent to yield inorganic ligand associated nanocrystals as a second dispersion; (c) isolating the inorganic ligand associated nanocrystals; (d) treating isolated inorganic ligand associated nanocrystals with a polar solvent to yield naked nanocrystals in the form of a powdery substance; (e) isolating and drying the powdery substance; and (f) subjecting the dry powdery substance to high pressure to yield a metal nanoparticle based bulk material.

Another aspect of the present invention provides a single component metal nanoparticle based bulk material comprising from about 8% to about 0.1% by weight of the ligand associated nanocrystals; and wherein the metal is palladium.

DETAILED DESCRIPTION OF THE INVENTION

The instant invention in one embodiment provides a process for making nanoparticle based bulk materials, said process comprising: (a) combining organic ligand associated nanocrystals in a non-polar solvent to form a first dispersion; (b) treating the first dispersion with a solution of an inorganic reagent in a polar solvent to yield inorganic ligand associated nanocrystals as a second dispersion; (c) isolating the inorganic ligand associated nanocrystals; (d) treating isolated inorganic ligand associated nanocrystals with a polar solvent to yield naked nanocrystals in the form of a powdery substance; (e) isolating and drying the powdery substance; and (f) subjecting the dry powdery substance to high pressure to yield a metal nanoparticle based bulk material.

A preferred embodiment of this aspect provides a process wherein the non-polar solvent is selected from hexanes, toluene, ether, pentane, benzene, octane, chloroform, THF, or combinations thereof. Another preferred embodiment provides a process wherein the polar solvent is selected from DMSO, DMF, water, methanol, acetic acid, acetonitrile, ionic liquid; and the non-polar solvent is selected from toluene, hexanes, ether, pentane, and benzene, octane, chloroform, and THF.

Another preferred embodiment provides a process wherein the inorganic organic ligand associated metal-based nanocrystals and the naked nanocrystals are isolated by centrifugation, filtration, or sedimentation. Yet another preferred embodiment provides a process wherein the nanocrystal is selected from a metal-based nanocrystal, ionic crystal semiconductor nanocrystal, metal oxide-based nanocrystals, and impurity doped nanocrystals.

A further preferred embodiment provides a process wherein (a) the metal in the metal-based nanocrystal is selected from gold, palladium, platinum, silver, titanium, zinc, cerium, iron, rhodium, bismuth, thallium, nickel, iron, iridium, tungsten, gallium, lead, ruthenium, copper, cobalt, silicon and alloys thereof; (b) the ionic crystal semiconductor nanocrystal is selected from based on perovskites, CdS, CdSe, CdTe, InP, InAs, ZnS, AlP, AlAs, AlSb, GaN, GaP, GaAs, InN, ZnSe, CuCl, $Cu_2S$, PbSe, PbS, PbTe, SnS, $SnS_2$, SnTe, and $Bi_2Te_3$; and (c) the metal oxide in the metal-oxide based nanocrystals is selected from oxides of iron, copper, zinc, uranium, bismuth, titanium, vanadium, nickel, silicon, and combinations thereof.

Yet another embodiment provides a process wherein the nanocrystals are independently associated with organic ligands selected from hydrocarbons comprising functional groups selected from carboxylic acid, amines, hydroxides, and thiol. Provides in yet another preferred embodiment is a process wherein the nanocrystals are independently associated with inorganic ligands selected from sulfides, phosphates, halogens, amides, and hydroxides, selenide, and phosphines, and inorganic cluster (metal chalcogenide, polyoxometalates), halide (Cl, I, and Br), Nitrosonium tetrafluoroborate.

Provided in another preferred embodiment is a process wherein the powdery substance comprises from about 8% to about 0.1% by weight of the ligand associated nanocrystals. A further preferred embodiment of this aspect provides a powdery substance comprising from about 5% to about 0.1% by weight of the ligand associated nanocrystals. Another further embodiment provides a process wherein the powdery substance comprises from about 2% to about 0.1% by weight of the ligand associated nanocrystals. A particularly preferred embodiment provides a process wherein the powdery substance comprises from about 1% to about 0.5% by weight of the ligand associated nanocrystals.

The present invention in one of its preferred embodiments provides a process wherein the nano particle-based material comprises a metal selected from gold, palladium, and silver, in particular the nano particle-based material comprises a metal selected from gold, and palladium.

Another aspect of the present invention provides a single component metal nanoparticle based bulk material comprising from about 8% to about 0.1% by weight of the ligand associated nanocrystals; and wherein the metal is palladium. A preferred embodiment of this aspect provides a single component metal nanoparticle based bulk material of Claim 15 comprising from about 5% to about 0.1% by weight of the ligand associated nanocrystals; and wherein the metal is palladium. Yet further preferred embodiment of this aspect provides a single component metal nanoparticle based bulk material of Claim 15 comprising from about 1% to about 0.1% by weight of the ligand associated nanocrystals; and wherein the metal is palladium.

BRIEF DESCRIPTION OF THE FIGURES

For the purpose of illustration, certain embodiments of the present invention are shown in the drawings described below. Like numerals in the drawings indicate like elements throughout. It should be understood, however, that the invention is not limited to the precise arrangements, dimensions, and instruments shown. In the drawings:

FIG. 1 CONT. depicts TEM images of metal NC coins.

EXPERIMENTAL OVERVIEW

Figure 1:
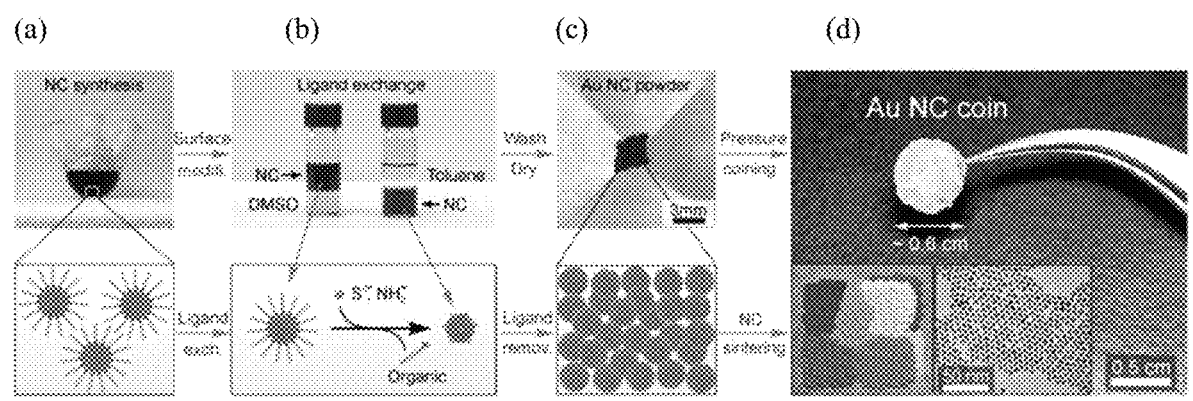
FIG. 1 depicts each NC in picture form during the transformation of the ligand associated NC to the NC coins.
Figure 1:
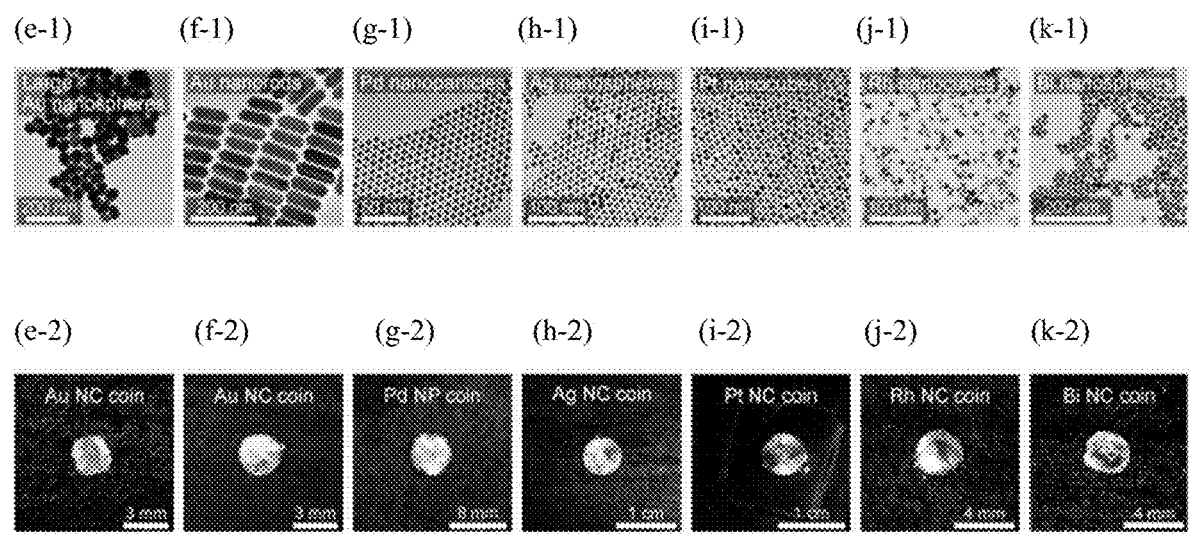

Disclosed herein is the bottom-up fabrication of GB materials through, what we call, the 'NC coining' process involves a ligand exchange of the synthesized metal NCs to replace the native organic capping ligands with small inorganic ones, followed by removals of ligand and solvent through washing and drying processes. The resulting solid NC powder can then be processed by pressure sintering to generate the final bulk GB NC coins. Herein we describe the process for the case of gold NC. A toluene solution of 1-dodecanethiol (DDT) capped small gold NCs (6.5 nm in diameter) was mixed with a $(NH_4)_2S$ dimethyl sulfoxide (DMSO) solution with an equal volume to initiate the ligand exchange reaction (FIG. 1a, b). After the ligand exchange was complete, the obtained S2- capped gold NCs were thoroughly purified by extraction using hexane and toluene, followed by washing with acetone and DMSO to remove the inorganic ligands and residual organic molecules (e.g., DDT), making the NC surfaces almost bare. Next, the gold NCs were thoroughly dried under vacuum, resulting in a black NC powder (FIG. 1c). Finally, the NC powder was loaded in a homemade piston-cylinder and sintered at a pressure of ~0.6 GPa, yielding a free-standing, dense, sub-centimeter-scale pellet, i.e., a gold NC coin (FIG. 1d). Notably, during the pressurization, the sample changed from its initial black color to a rusty metallic golden color (FIG. 1d). This NC coining technique can be generalized to produce coins from metal NCs with different sizes, shapes (sphere, cube, and rod), native ligands (polar and nonpolar molecules, as well as polymers), and compositions (gold, palladium, silver, platinum, rhodium, and bismuth) (FIG. 1e-k).

A striking result of the coining process was the change in sample appearance, as the materials changed from an absorption-dominant condition to a reflection-prevailing state (FIG. 1c-k). The absorption spectrum of the as-synthesized DDT-capped gold NCs (6.5 nm in diameter) in toluene showed a peak located at 519 nm, which was attributed to the localized surface plasmon resonance (LSPR) (FIG. 2a). After replacing DDT with inorganic ligands (i.e., S2-), the LSPR peak showed a redshift by 49 meV (~11 nm) due to both the NC surface charge redistribution and an increased dielectric constant of the solvent (toluene vs. DMSO). The high absorption coefficient of the LSPR is consistent with the black color of the resulting NC powder after drying (FIG. 1c). After NC coining, electrons can freely move across nanodomains within the gold NC coin, preventing electron localization and thus diminishing LSPR. Alternately, a new surface plasmon polariton mode was observed in the NC coin as a result of the interactions between the surface delocalized electrons and the air, leading to the observed metallic color (FIG. 1*d-k*). Consistent with its golden appearance, reflectance measurement of the obtained gold NC coin showed a high reflectivity at long wavelengths (~600 nm) accompanied by a characteristic drop at approximately 500 nm (FIG. 2*b*).

Despite the dramatic change in material appearance caused by the NC coining process, all the NC coins made from different metal NCs with various sizes and shapes retained their original, nanometer-sized crystal domains (FIG. 1*d-k*). X-ray diffraction (XRD) patterns of the DDT-capped gold NCs and gold NC coin showed almost identical profiles with unchanged grain sizes based on a Scherrer analysis (6.5±0.6 nm for the DDT-capped gold NCs vs. 6.9±1.2 nm for the gold NC coin) (FIG. 2*c*). High-resolution transmission electron microscopy (HR-TEM) measurements confirmed that the crystal domain sizes of the NC coin were close to the size of the original gold NCs (FIG. 2*d*). Moreover, the crystal domains were oriented randomly with respect to each other, suggesting that a fusion of gold NCs occurred during the coining process irrespective of the lattice orientation of the NCs (FIG. 2*d*).

Experimental Procedures
Chemical/Reagent/Solvent Sources

Acetone, benzene, methanol, ethanol, hexane, dimethyl sulfoxide (DMSO), tetrahydrofuran (THF), 1-octadecene (ODE, 90%), 1-dodecanethiol (DDT, 98%), ammonium sulfide solution (($NH_4$)$_2$S, 40-48 wt. % in H2O), bismuth neodecanoate (Bi(nda)), dehydrated trisodium citrate (≥99.5%, $C_6H_5Na_3O_7 \cdot 2H_2O$), chlorobenzene, ethylene glycol (99%), gold (III) chloride trihydrate (99.9%, $HAuCl_4 \cdot 3H_2O$), hydrochloric acid (HCl, 37 wt. % in water), iron(0) pentacarbonyl ($Fe(CO)_5$, 99.99% metal basis), L-ascorbic acid (BioUltra, ≥99.5%), oleic acid (OAcid, technical grade 90%), oleylamine (OAm, 70%), palladium (II) acetylacetonate (Pd(acac)2, 98%), polyvinilpyrrolidone (PVP, average mol. wt. 40,000), silver nitrate ($AgNO_3$, >99%), sodium borohydride ($NaBH_4$, 99%), sodium amide ($NaNH_2$, 95%), tert-butylamine borane complex (TBAB, 97%), trioctylphosphine (TOP, 97%), and trioctylphosphine oxide (TOPO, 99%) were obtained from Sigma Aldrich. Chloro(triphenylphosphine)gold(I) (($Ph_3P$)AuCl, 99.99% (metals basis)), Potassium bromide (KBr, 99+%), platinum (II) 2,4-pentanedionate (Pt(acac)$_2$, Pt 48.0% minimum), sodium hexachlororhodate(III) dodecahydrate ($Na_3RhCl_6$, Rh 17.1%), palladium foil (0.1 mm thick, 99.9%, 25×25 mm) were purchased from Alfa Aesar. Hexadecyltrimethylammonium bromide (CTAB, >98.0%), and sodium oleate (NaOL, >97.0%) were purchased from TCI America.

Nanocrystal (NC) Synthesis Details

Nanocrystals (NC's) were synthesized using methods known in the art. The NC's obtained by procedures outlined below were generally capped with organic ligands.

Example 1: 6.5 nm Gold NCs (DDT-Capped)

Synthesis of gold NCs was carried out using a method previously reported by Zheng, N., Fan, J. & Stucky, G. D. One-step one-phase synthesis of monodisperse noble metallic nanoparticles and their colloidal crystals. *J. Am. Chem. Soc.* 128, 6550-6551 (2006). The procedure consisted of loading 480 mg ($Ph_3P$)AuCl, 0.5 mL 1-DDT, and 80 mL benzene into a round-bottom flask to form a solution. Under nitrogen blanket, the solution was heated to about 75° C., and 881 mg TBAB was swiftly added to the flask. The reaction mixture solution changed in color from transparent (pale yellow) to dark burgundy immediately after the injection/addition of TBAB. The reaction mixture was maintained at a temperature of about 75° C. for about 1 hour. The reaction mixture was quenched by cooling in an ice water bath to form gold nanocrystals. The resulting gold NCs were precipitated by diluting the reaction mixture with acetone and ethanol, and isolated/collected by centrifugation. The isolated gold NCs were then dispersed in toluene and stored for their use in the next step.

Example 2: 61 nm Gold Nanospheres (Citrate-Capped)

Gold nanospheres with an average diameter of 61 nm were synthesized via the Turkevich method as disclosed by J. Kimling, M. Maier, B. Okenve, V. Kotaidis, H. Ballot, and A. Plech in J. Phys. Chem. B 2006, 110, 32, 15700-15707. The procedure involved dissolving 7.94 mg sodium citrate in 50 mL distilled $H_2O$ and heating the reaction mixture to its boiling point with continuous stirring. The boiling reaction mixture then was diluted with an aqueous solution of 300 μL of $HAuCl_4$ (0.08 M). The diluted reaction mixture was stirred for another 30 mins and then cooled to yield gold NCs in the form of nanospheres. The gold NCs were isolated by centrifugation. The isolated gold nanospheres were stored in water for their use in the next step.

Example 3: 40-Nm Width and 111-Nm Length Gold Nanorods (CTAB-Capped)

Gold nanorods were made by a CTAB-assisted seeded growth approach as disclosed by Ye, X. C., Zheng, C., Chen, J., Gao, Y. Z. & Murray, C. B. Using Binary surfactant mixtures to simultaneously improve the dimensional tunability and monodispersity in the seeded growth of gold nanorods. *Nano Lett.* 13, 765-771 (2013).

Seed solutions were prepared by mixing 5 mL of $HAuCl_4 \cdot 3H_2O$ aqueous solution (0.5 mM) and 5 mL of CTAB aqueous solution (0.2 M) in a 20 mL vial. The seed solution was further stirred at 30° C. for several minutes (about 10 mins). The stirred mixture was then diluted with 0.6 mL of aqueous 0.01M fresh NaBH4. The resulting solution was then aged at 30° C. for 30 min. To the aged solution was then added 2.7 g of CTAB and 0.3702 g of sodium oleate dissolved in 75 mL of distilled water and the resulting solution was stirred for 20 min at 80° C. The stirred solution was cooled down to about 30° C. followed by an addition of aqueous 5.4 mL $AgNO_3$ (4 mM). The resulting mixture was let stand for about 20 mins followed by dilution with 75 mL of $HAuCl_4$ aqueous solution (1 mM). The mixture was kept at the same temperature for 1.5 h, then 4.5 mL of HCl aqueous solution was injected and further stirred for 15 min. Finally, 3.75 mL of ascorbic acid aqueous solution (0.064 M) and 120 μL seed solution were swiftly added, and the resultant mixture was kept undisturbed for 12 hours at 30° C. for 12 h. The product was purified through centrifugation. The resulting gold nanorods were stored in water for their use in the next step.

Example 4: 6.3 nm Amorphous Palladium NPs (OAm/TOP-Capped)

Synthesis of palladium NPs was carried out by following a method previously reported by Kim, S. W. et al. Synthesis of monodisperse palladium nanoparticles. *Nano Lett.* 3, 1289-1291 (2003) but with some minor modifications. A mixture/solution of 407 mg Pd(acac)2, 4 mL TOP, and 40 mL OAm were placed in a round-neck flask. The mixture was degassed at room temperature for 1 hour under vacuum. The reaction mixture was then heated to 280° C. under nitrogen slowly (c.a. 3° C./min), and kept at 280° C. for 30 min. The reaction mixture then was quenched by removing the heating mantle and blowing cool air. The resulting product was purified through centrifugation after precipitation with ethanol. The resulting palladium NPs were stored in toluene for their use in the next step.

Example 5: 9.5 nm Silver NCs (OAm-Capped)

Silver NCs were synthesized according to a method reported by Wang, D. S., Xie, T., Peng, Q. & Li, Y. D. Ag, $Ag_2S$, and $Ag_2Se$ nanocrystals: Synthesis, assembly, and construction of mesoporous structures. *J. Am. Chem. Soc.* 130, 4016-4022 (2008), but with minor modifications. Specifically, in our experiment, in order to enhance the crystallinity and size uniformity of the silver NCs, an annealing treatment and size-selective precipitation were introduced following the synthesis of silver NCs. 10 mL of OAm was loaded into a 50 mL flask and degassed under vacuum at 50° C. for 1 hour. The reaction solution was then heated to 180° C. under nitrogen, and 500 mg of $AgNO_3$ was swiftly added. Right after the addition, the color of the solution changed from colorless to dark orange. After 10 min, the reaction solution was cooled down to room temperature (RT), and the product was precipitated by dilution with acetone followed by centrifugation. The product was then dispersed in 10 mL toluene. The solution was heated to reflux and kept for 4 hours before the reaction solution was cooled down to room temperature (RT). Uniform NCs were collected by centrifugation and stepwise addition of acetone. The final product was stored in toluene for use in the next step.

Example 6: 8.4 nm Platinum NCs (OAm-Capped)

Platinum NCs were synthesized via a decomposition reaction of $Pt(acac)_2$ as disclosed by 57 Wang, C., Daimon, H., Onodera, T., Koda, T. & Sun, S. H. A general approach to the size and shape-controlled synthesis of platinum nanoparticles and their catalytic reduction of oxygen. *Angew. Chem. Int. Ed.* 47, 3588-3591 (2008). In a 100 mL flask was placed 400 mg $Pt(acac)_2$, 4 mL OAcid, 4 mL OAm, and 20 mL ODE to form a mixture. The mixture was degassed under vacuum for 1 hour and then heated to 60° C. resulting in the formation of a solution. The solution was then heated up to about 145° C. In another vial, 0.4 mL $Fe(CO)_5$ was mixed with 4 mL anhydrous hexane under an inert condition. Subsequently, the $Fe(CO)_5$ solution was swiftly injected into the reaction solution and kept at 145° C. for about 2 hours. The reaction mixture then was quenched by removing the heating mantle and blowing in cool air. The product was collected through centrifugation following precipitation by ethanol. The resulting platinum NCs were stored in toluene for their use in the next step.

Example 7: 7.3 nm Rhodium NCs (PVP-Capped)

The synthesis of rhodium NCs was accomplished using the procedure reported by Zhang, H. et al. Controlling the morphology of rhodium nanocrystals by manipulating the growth kinetics with a syringe pump. *Nano Lett.* 11, 898-903 (2011). A 100 mL flask was loaded with 53 mg of L-ascorbic acid, 107 mg of KBr, and 7 mL ethylene glycol to form a solution. The solution was heated to about 110° C. and kept for 2 hours under air to yield solution A. Meanwhile, 72 mg of $Na_3RhCl_6$ and 122 mg of PVP (average mol. wt 40,000) were respectively and separately dissolved in 6 mL ethylene glycol to yield solutions B and C respectively. Solution A was heated up to about 140° C., and solutions B and C were respectively sequentially injected at the rate of 60 mL/h in the first 1 min (1 mL), and at the rate of 4 mL/h after the first 1 min. The resulting reaction mixture was quenched by removing the heating mantle and blowing in cool air, followed by centrifugation after mixing the reaction solution with acetone and ethanol. The resulting rhodium NCs were stored in methanol for their use in the next step.

Example 8: 18.9 nm Bismuth NCs (DDT-Capped)

Bismuth NCs were made by a method reported by Son, J. S. et al. Large-scale synthesis and characterization of the size-dependent thermoelectric properties of uniformly sized bismuth nanocrystals. *Angew. Chem. Int. Ed.* 50, 1363-1366 (2011), with minor modifications. A reaction flask was loaded with 1.54 g Bi(nda) and 10 mL ODE to form a solution. The solution was degassed under vacuum at 80° C. Subsequently, 0.5 mL DDT and 0.5 mL OAm were added into the solution. The resulting solution was heated up to about 80° C. followed by an injection of 4 mL TOP. The reaction solution was kept at about 75° C. for about 100 seconds. The reaction mixture was cooled in an ice-water bath to yield the bismuth NCs in a crude form. The crude product form was collected through centrifugation, followed by another round of the washing process using THF to yield the bismuth NCs in the form of a fine powdery substance. The final fine powdery substance was stored in THF for their use in the next step.

Ligand Exchange

As discussed above, NCs made above have a native organic ligand associated with it. Removal of the organic ligand is necessary to form nanoparticles without any ligand bound thereby providing a nanocrystal without a ligand, referred to as a nanoparticle or a naked nanocrystal. The process to make nanoparticles is as described below.

Example 10

Ligand exchange with S2- for hydrocarbon chain-tethered NCs in toluene (6.5 nm gold NCs and 18.9 nm bismuth NCs) Ligand exchanges with S2- were conducted as follows: $(NH_4)_2S$ was diluted to 0.1~0.05% in DMSO. A NC toluene solution was mixed with the solution, and the mixture was vigorously stirred for 15 min. In order to extract the exchanged native surface ligand, two-layers extraction purification was employed; hexane was added to the mixture solution leading to two-phase liquid separation. The upper transparent layer contained hexane, toluene, and the native ligand (molecules with long hydrocarbon chains), the colored bottom layer consisted of polar components such as DMSO and S2- capped NCs. The top layer was carefully removed. This process was repeated until the interface between the two layers became clear, which typically took 3-5 times. Acetone was added to the resulting NC-DMSO solution to crash out the NCs, followed by centrifugation at 12,000 rpm for 15 min. Multiple rounds of purification using DMSO and acetone were carried out. The collected powder sample was further washed by acetone for multiple times and dried completely under vacuum for several days, resulting the final NC powder.

Example 11

Ligand exchange with S2- for water-dispersible NCs (61 nm gold nanospheres and 40-111 nm gold nanorods) First, (NH$_4$)$_2$S was diluted to 0.1% in DMSO. Then, 20 mL of the aqueous NC colloidal solution as mixed with 0.2 mL of (NH$_4$)$_2$S DMSO solution, and the mixture was stirred for 15 min until the surface reaction was completed. The solution was then centrifugated at 12,000 rpm for 15 min. The collected precipitate was readily dispersed in DMSO, but could no longer be dispersed in water, indicating a successful ligand exchange with S2-. The NCs were further washed using water and isopropanol for multiple rounds. The final product was further washed by isopropanol for multiple times and dried under vacuum for several days, resulting the dried NC powder.

Example 12

Ligand exchange for with NH$_2$— for OAm-capped NCs (8.4 nm platinum, 6.3 nm palladium, 9.5 nm silver, and 7.3 nm rhodium NCs) The procedure of ligand exchanges with NH$_2$— was as follows; 20 mg of NaNH$_2$ was dissolved in 10 mL DMSO, followed by an addition of 10 mL of the colloidal sample solution. The mixture was stirred for 2 days to complete the ligand exchange. For purification of the NCs capped with NH$_2$—, we employed a typical centrifugation method with nanopore water (good solvent) and acetone and/or isopropanol (bad solvent). The purification process was repeated twice. The resulting precipitate was further washed using acetone and/or isopropanol for multiple rounds. The final product was dried under vacuum for several days, resulting the dried NC powder, shown in FIG. 1c.

Figure 5:
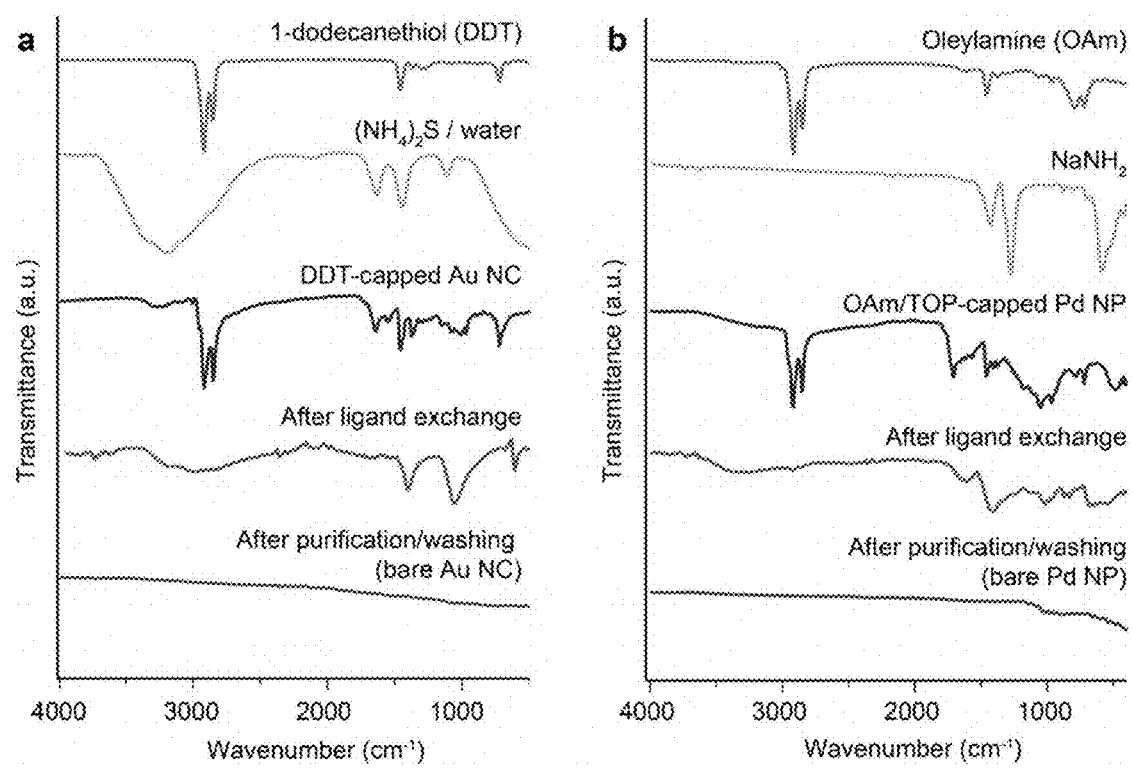
FIG. 5 shows IR spectrometric analysis of each of the materials used in the present invention.

The ligand exchange and conversion of the NCs to the naked nanocrystals was tested using IR spectrometric analysis as shown in FIG. 5.

The NC powder was then subjected to high pressure to undergo a coining process wherein the process yielded bulk material made of nanoparticles. It should be noted that while the instantly claimed process strips the nanocrystals of its ligands to yield naked nanocrystals or nanoparticles it does not change the shape of the nanocrystals. Removal of the ligand promotes the direct bonding between the nanocrystals thereby yielding a denser material.

Pressure-Induced NC Coining Process

The pressurizing process in the NC coining process was performed using a piston cylinder. The pressure stage and piston cylinder were made of tungsten carbide. The NC powder was placed in the cylinder and force was applied using a pellet maker to yield the NC coin as shown in FIG. 1d. The NC coin is made of the bulk material corresponding to the respective metal nanoparticle.

Polishing NC Coins

For the reflectance and nanoindentation measurements, the surface of the samples was polished using the standard procedure described in *Metallographic Handbook* by PACE Technologies, USA (https://www.metallographic.com/). Typically, NC-coins were attached to glass substrates using a thin layer of epoxy (Loctite Stycast). Next, 800 (P2400) grit SiC paper followed by P1200 grit ALO paper was used to flatten the sample surface using water as the lubricant. Subsequently, the sample was polished for 2 min using a 1-micron diamond powder on ATLANTIS polishing pad. Finally, the surface was polished using a 0.05-micron Nanometer alumina on NAPPAD polishing pad.

FIGURES

FIG. 1: Fabrication of Metal NC Coins

This figure shows: (a) the schematic of colloidally synthesized native ligand DDT-capped gold NCs dispersed in toluene (a); (b) ligand exchange from native organic to inorganic ligands, transferring NCs from a non-polar phase (toluene) to a polar solvent (DMSO). (c) a photograph of gold NC powder. (d) a photograph of a NC coin made from 6.5 nm gold NCs. Insets: a model of nanometer-sized GB condition (left) and a TEM image of the original gold NCs (right).

FIG. 1 CONT.: TEM Images of Metal NC Coins.

This figure shows Schematic of the NC coining process. TEM images of the metal NCs (top row, e-1 through k-1) and photographs of the respectively corresponding NC coins (bottom row; e-2 through k-2). Image (e-1): represents nanoparticles of gold nanospheres (61 nm) while image (e-2) represents a photograph of the corresponding NC coin made using the gold nanoparticles from (e-1). Image (f-1) represents gold nanorods (40-nm width and 111-nm length) and image (f-2) represents a photograph of the corresponding NC coin made using the gold nanorods from (f-1). Image (g-1) represents palladium nanoparticles (6.3 nm) while image (g-2) represents the corresponding NC coin made using the palladium nanoparticles from (g-1). Image (h-1) represents silver nanospheres (9.5 nm) and image (h-2) represents the corresponding NC coin made using the silver nanoparticles from (h-1). Image (i-1) represents platinum particles in the shape of nano-cubes (8.4 nm) and image (i-2) represents the corresponding NC coin made using the platinum nanoparticles in (i-1). Image (j-1) represents rhodium particles in the shape of nano-cubes (7.3 nm), and image (j-2) represents NC coin made using the rhodium nanoparticles from (j-1). Image (k-1) represents bismuth nanospheres (18.9 nm), and image (k-2) represents NC coin made using the bismuth nanospheres from (k-1).

Figure 2:
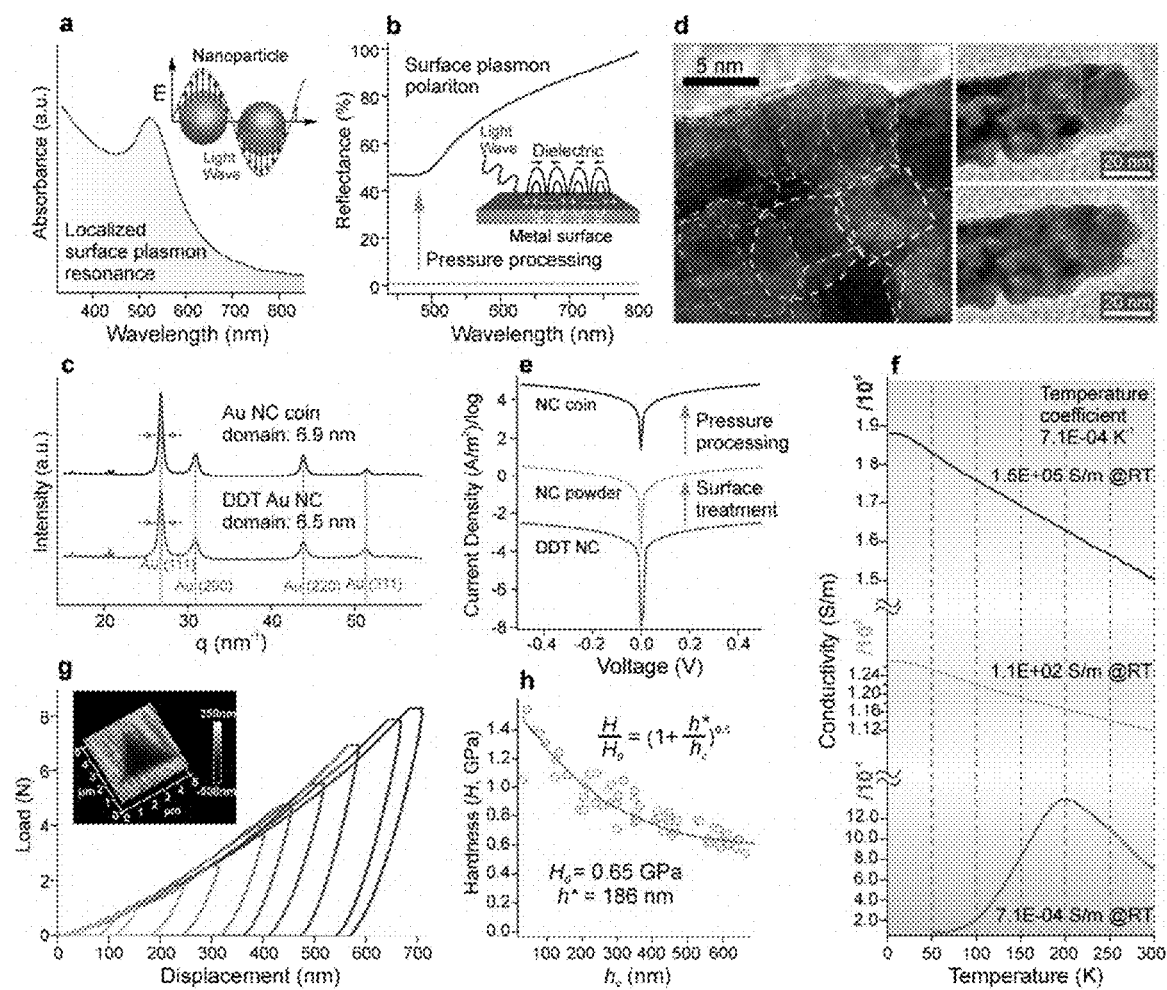
FIG. 2 depicts characterization of gold NC coins using UV-Vis absorption spectra.

FIG. 2|Characterizations of Gold NC Coin.

FIG. 2 represents the characterization of the NC coins using UV-Vis absorption spectrum. (a) UV-Vis absorption spectrum of the original DDT-capped 6.5 nm gold NCs dispersed in toluene, exhibiting a localized surface plasmon resonance (inset). (b) Reflection spectra of gold NC powder (green) and gold NC coin (blue). The gold NC coin exhibits a surface plasmon polariton mode (inset). (c) XRD spectra of the original DDT-capped gold NCs (green) and the resultant sintered gold NC coin (blue). (d) A HR-TEM image of a thin piece of the gold NC coin with color-coded crystal domains (see the details in SI). (e) I-V curves of the original DDT-capped gold NCs (green), gold NC powder (yellow) and sintered gold NC coin (blue). (f) Plots of electric conductivity as a function of temperature for the original DDT-capped gold NCs (green), the gold NC powder (yellow) and gold NC coin (blue). (g) Representative load displacement (h-P) curves from nanoindentation measurements of the gold NC coin. Inset: a 3D atomic force microscopy image of an indentation from the measurement. (h) A plot of hardness (II) as a function of the indentation depth showing data from 64 nanoindentation measurements. It should be noted that spectra in (c) and (e) confirm that there is no change in the structure or structural integrity of the core nanocrystal structure with the DDT-capped gold NCs and resultant sintered NC coin.

Figure 3:
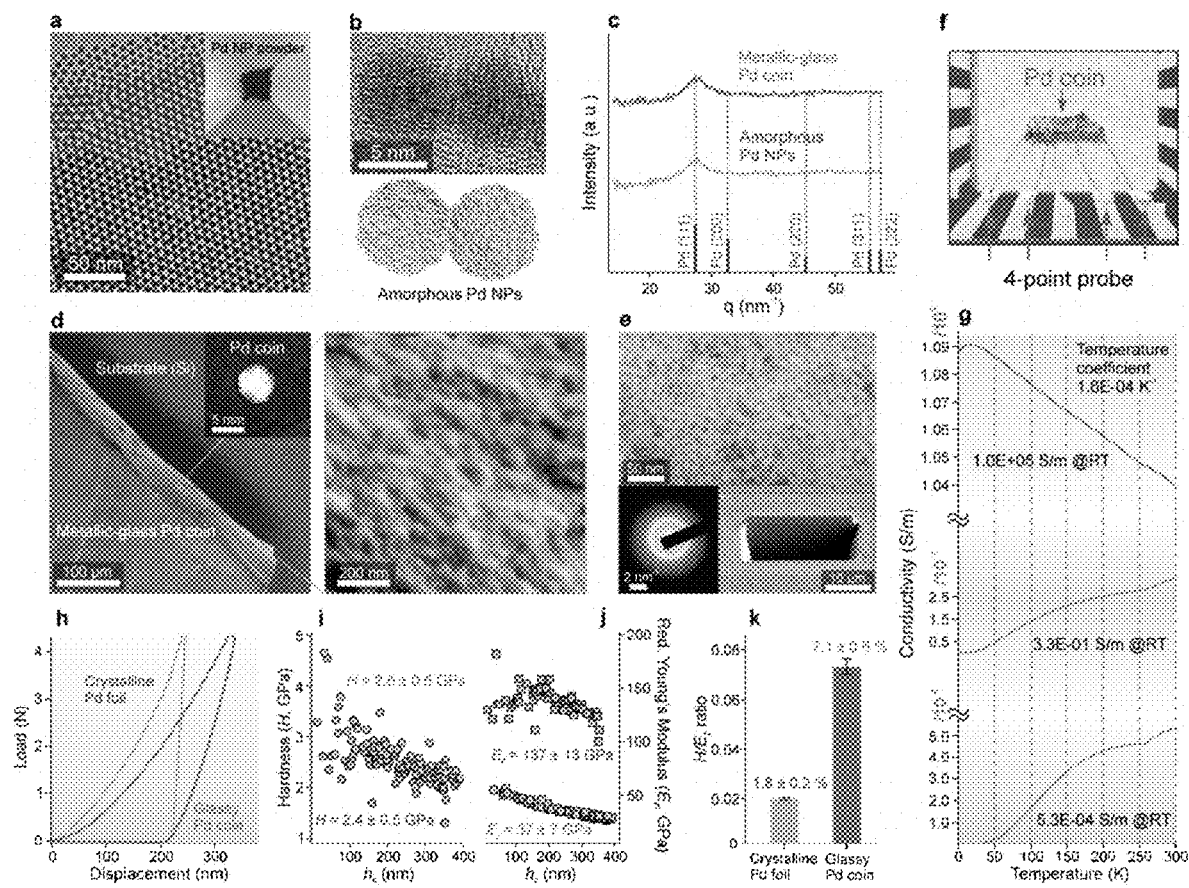
FIG. 3 shows a TEM image of the amorphous Pd NPs capped with organic ligands for characterizations of the metallic-glass Pd coin.

FIG. 3|Characterizations of the Metallic-Glass Pd Coin.

FIG. 3 represents images that characterize the metallic glass Pd coin. (a) A TEM image of the amorphous Pd NPs capped with organic ligands. Inset: a photograph of Pd NP powder. (b) A HR-TEM image of the Pd NP capped with NH2-, showing no atomic lattice fringes. (c) XRD spectra of the Pd NPs capped with NH2- (pink) and the Pd coin (blue). The blue bars indicate the standard XRD peak positions of crystalline Pd metal. (d) SEM images of the Pd coin with a low (left) and a high magnification (right). Inset: a photograph of the Pd coin. (e) A STEM image of a Pd coin thinly sliced by a focused ion beam (FIB) (top), the corresponding selected-area electron diffraction (bottom left), and an SEM image of the surface area of Pd coin cut by FIB (bottom right). (f) A photograph of a piece of Pd coin in the 4-point probe setting for electric conductivity measurements. (g) Plots of electric conductivity as a function of temperature for the original Pd NPs capped with organic ligands (pink), the Pd NP powder (green), and the Pd coin (blue). (h) Representative load-displacement (h-P) curves from nanoindentation measurements for crystalline Pd foil (pink) and glassy Pd coin (blue). (i-j) Plots of the hardness (H, panel i) and reduced Young's modulus (Er, panel j) as a function of indentation depth, showing data from 64 nanoindentation measurements. (k) H/Er (hardness/reduced Young's modulus) ratios for crystalline Pd foil and glassy Pd coin.

Figure 4:
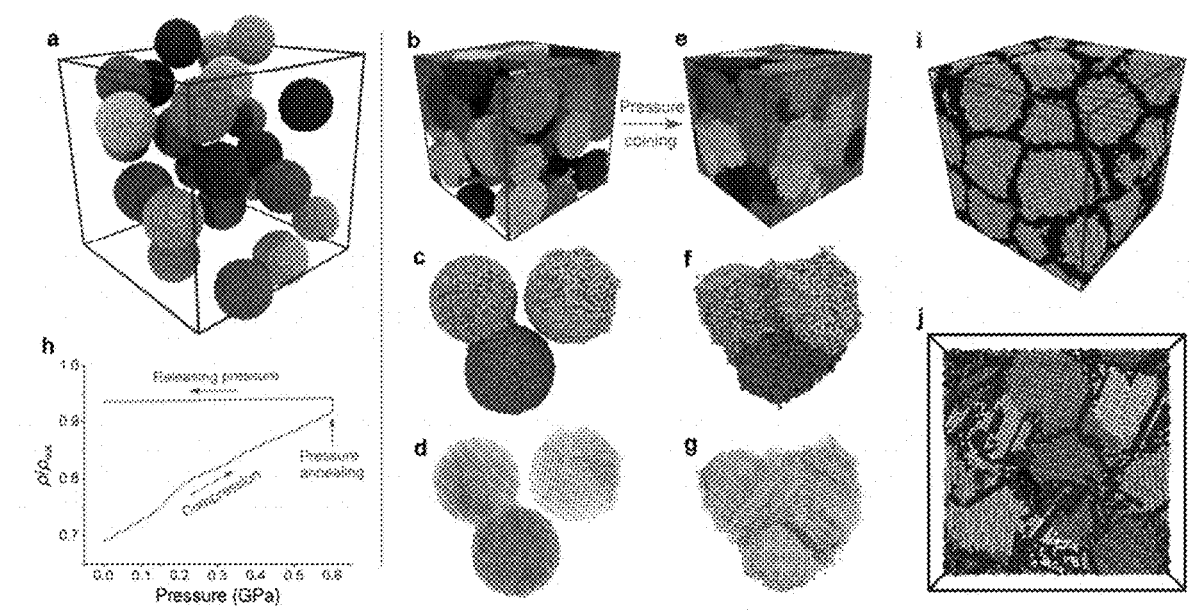
FIG. 4 depicts the molecular dynamic simulations of NC coining.

FIG. 4|Molecular Dynamics Simulations of NC Coining.

FIG. 4 represents simulated figures of NCs starting from NCs with bound ligands as shown in FIG. 1a through FIG. 1d. FIG. 4-a represents initial configuration of 27 spherical gold NCs as also shown in FIG. 1a. The NCs in FIG. 4-a and FIG. 1a represent NCs with bound native ligands. FIGS. 4-b, 4-c and 4-d represent NCs in the powdery substance wherein the NCs are not associated with any ligands, or in other words naked nanocrystals. FIGS. 4-e, 4-f, and 4-g shows a simulation of the packing in a NC coin, in other words after the material in FIGS. 4-b, 4-c, and 4-d is subjected to pressure. FIGS. 4b-g represent snapshots of NC system (b, e) and three NCs (c, d, f, g) at 1 atm and 300 K, before (b-d) and after compression to 0.6 GPa (e-g). In panels d and g, gold atoms are shown in smaller size to reveal the domain structure of the NCs. In panels b-g, gold atoms are color-coded according to the NC they originate in panel a. (h), A plot of the density ρ of the NC system, relative to the density $\rho_{bulk}$ of bulk gold, as a function of pressure during the coining process. (i), A slice through the final NC coin, illustrating zones of sintering between different NCs. Atoms with at least one nearest neighbor from a different NC are highlighted in blue color; atoms that are still surrounded exclusively by neighbors from the same NC are shown in gold color. (j), A slice through the final coin, illustrating the grain boundary structure. Atoms in grain boundaries (i.e., local environments that deviate substantially from a bulk fcc crystal, see Experimental Procedures) are shown in dark grey color; atoms in pristine local fcc environments are colored according to the NC they originated in.

FIG. 5: Fourier-Transform Infrared Spectroscopy (FT-IR) Spectra of the Ligand Molecules and the NC Samples During the Surface Treatment Process FIG. 5 shows the IR spectrum of the organic ligands, inorganic ligands, organic ligand capped NC, inorganic ligand capped NC and finally the naked nanocrystals. In particular this figure shows the fourier-transform infrared spectroscopy (FT-IR) spectra of the ligand molecules and the NC samples during the surface treatment process. (a) from top to bottom: DDT, $(NH_4)_2S$ water solution, DDT-capped gold NCs, gold NCs after ligand exchange with $(NH_4)_2S$, and bare gold NCs after purification and washing processes; and (b) from top to bottom: OAm, $NaNH_2$, OAm/TOP-capped Pd NPs, Pd NPs after ligand exchange with $NaNH_2$, and bare Pd NPs after purification and washing processes.

Definitions

As used herein, the following terms are intended to have the meaning as defined in this section and elsewhere in this document. It is further understood that plurals of terms may be used to indicate multiple units, substituents, and the like. An illustrative example would be the term(s) "nanocrystal" and "nanocrystals" which would represent a nanocrystal (defined elsewhere in this document) or a plurality of nanocrystal units. Other than representing a plurality of units will not change the meaning for the respective term.

The terms "nanocrystals", "nano-crystal", and/or "nano crystal" as used here in can be used interchangeably and are intended to represent a lattice-shaped arrangement of atoms that typically has dimensions of less than 100 nanometers, such as a quantum dot.

The terms "naked nanocrystal", "naked nano-crystal", "naked nano crystal", and/or "naked nano crystals" as used herein can be used interchangeably and represent a nanocrystal as defined above but without a ligand (whether organic ligand, inorganic ligand, some other ligand, or combinations thereof) bound to the nanocrystal.

The term "ligand" as used herein represents an organic or inorganic ligand and is intended to represent a chemical entity an ion or molecule attached to a metal atom by coordinate bonding. In the present context ligands are characterized as "organic ligands" and "inorganic ligands".

The term "organic ligand" as used herein is intended to represent organic molecules usually composed of carbon atoms in rings or long chains, to which are attached other atoms of such elements as hydrogen, oxygen, and nitrogen. Illustrative examples of organic ligands are hydrocarbons comprising functional groups selected from carboxylic acid, amines, hydroxides, and thiol.

The term "inorganic ligand" is intended to represent an inorganic compound which lacks a carbon-hydrogen bond and is a compound that is not an organic compound. Illustrative examples of inorganic ligands include sulfides, phosphates, halogens, amides, and hydroxides, selenide, and phosphines, and inorganic cluster (metal chalcogenide, polyoxometalates), halide (Cl, I, and Br), Nitrosonium tetrafluoroborate.

The term "nanoparticle", "nano-particle", "nano particle" as used herein is intended to represent a nanocrystal without a ligand associated with it. This term also can be used interchangeably with the term "naked nanocrystal".

The term "protic solvent" as used herein is intended to represent a protic solvent that has a hydrogen atom bound to an oxygen (as in a hydroxyl group), a nitrogen (as in an amine group), or fluoride (as in hydrogen fluoride). In general terms, any solvent that contains a labile $H^+$ is called a protic solvent. The molecules of such solvents readily donate protons ($H^+$) to solutes, often via hydrogen bonding. a solvent generally understood to be capable of donating a proton. Illustrative examples of a protic solvent are water, methanol, isopropanol, ethanol, nitromethane, and acetic acid.

The term "non-polar solvent" as used herein is intended to represent molecules that have the charge evenly distributed therefore the molecules have low dielectric constant. Non-polar solvents are generally hydrophobic (immiscible with water). Non-polar solvents are lipophilic as they dissolve non-polar substances such as oils, fats, greases. Examples of non-polar solvents: carbon tetrachloride ($CCl_4$), benzene ($C_6H_6$), and diethyl ether ($CH_3CH_2OCH_2CH_3$), hexane ($CH_3(CH_2)_4CH_3$), methylene chloride ($CH_2Cl_2$).

The term "polar solvent" as used herein is intended to represent a molecule that consists of a polar group OH and a non-polar tail. The structure may be represented by a formula R—OH. Polar protic solvents dissolve other substances with polar protic molecular structure. Polar protic solvents are miscible with water (hydrophilic). Examples of polar protic solvents: water (H—OH), acetic acid (CH$_3$CO—OH)methanol (CH$_3$—OH), ethanol (CH$_3$CH$_2$—OH), n-propanol (CH$_3$CH$_2$CH$_2$—OH), n-butanol (CH$_3$CH$_2$CH$_2$CH$_2$—OH). The term "polar solvent" also includes non-protic solvents with large dielectric constants (>20) and large dipole moments, but they do not participate in hydrogen bonding (no O—H or N—H bonds). Their high polarity allows them to dissolve charged species such as various anions used as nucleophiles (e.g. CN(—), HO(—), etc.). The lack of hydrogen bonding in the solvent means that these nucleophiles are relatively "free" in solution, making them more reactive. For our purposes these solvents do not participate in reactions. Illustrative examples of non-protic polar solvents are dimethyl sulfoxide (DMSO), N,N-dimethylformamide (DMF), and acetonitrile (MeCN).

The term "bulk material" as used herein is intended to represent materials with the size of at least one dimension is larger than about 10 micrometers. The term bulk materials is intended to indicate materials made of nanoparticles that generally would range between 0.01 to about 100 nanometers.

The term "dispersion" as used herein is intended to represent a system in which particles of one material (e.g., nanocrystals, nanoparticles) are dispersed in a continuous phase of another material (e.g., solvents).

The term "solution" as used herein is intended to represent a system in which molecules are dissolved in solvents. The dissolved molecules become part of the solvent to form a solution.

The term "powdery substance" is intended to represent dry solids composed of many very fine (from about 1 nm~100 micrometers) particles that may flow freely when shaken or tilted.

The term "ionic-liquid" is intended to represent a salt in a liquid state, sometimes also referred to as liquid electrolytes, ionic melts, ionic fluids, fused salts, liquid salts, and ionic glasses.

The term "filtration" is intended to represent a technique to separate out solid products that remain suspended or do not dissolve in a solvent thereby forming a heterogenous mixture. Filtration generally involves pouring the heterogenous mixture through a membrane (such as a filter paper) such that the solids from the heterogenous mixture remain on the membrane while the liquid passes through.

The term "high pressure" is intended to represent a range of pressure from about 10 MPa to about 10 GPa.

The term "centrifugation" is intended to represent a technique to separate out solid products using centrifugal force.

The term "metal oxide" is intended to represent oxidized metals, usually expressed as M$_x$O$_y$, where M is a metal and O is oxygen, and with x and y of arbitrary numbers. Illustrative examples of metals include iron, copper, zinc, uranium, bismuth, titanium, vanadium, nickel, silicon, manganese, tungsten, and molybdenum.

The term "sedimentation" as used herein is intended to represent a technique to separate out solid products using external forces (e.g., gravity, magnetic field, electric field).

The following terms and abbreviations have the meanings as indicated below:
HR: High Resolution
NC: Nano Crystal(s)
NP: Nano Particle(s)
SEM: Scanning Electron Microscopy
STEM: Scanning Transmission Electron Microscopy
TEM: Transmission Electron Microscopy
XRD: X-ray Diffraction

The invention claimed is:

1. A process for making nanoparticle based bulk materials, said process comprising:
   (a) combining organic ligand associated nanocrystals in a non-polar solvent to form a first dispersion;
   (b) treating the first dispersion with a solution of an inorganic reagent in a polar solvent to yield inorganic ligand associated nanocrystals as a second dispersion;
   (c) isolating the second dispersion comprising the inorganic ligand associated nanocrystals;
   (d) treating the isolated second dispersion comprising the inorganic ligand associated nanocrystals with a polar solvent to yield a powdery substance comprising naked nanocrystals;
   (e) isolating and drying the powdery substance; and
   (f) subjecting the dry powdery substance to pressure of from 10 MPa to 10 GPa to yield a metal nanoparticle based bulk material.

2. The process of claim 1 wherein the non-polar solvent is selected from hexanes, toluene, ether, pentane, benzene, octane, chloroform, tetrahydrofuran (THF), or combinations thereof.

3. The process of claim 2 wherein the polar solvent is selected from dimethyl sulfoxide (DMSO), dimethylformamide (DMF), water, methanol, acetic acid, acetonitrile, ionic liquid; and the non-polar solvent is selected from toluene, hexanes, ether, pentane, and benzene, octane, chloroform, and tetrahydrofuran (THF).

4. The process of claim 2 wherein the inorganic ligand associated nanocrystals and the naked nanocrystals are isolated by centrifugation, filtration, or sedimentation.

5. The process of claim 4 wherein the nanocrystals are selected from a metal-based nanocrystal, ionic crystal semiconductor nanocrystal, and metal oxide-based nanocrystals.

6. The process of claim 5 wherein:
   (a) the metal in the metal-based nanocrystal is selected from gold, palladium, platinum, silver, titanium, zinc, cerium, iron, rhodium, bismuth, thallium, nickel, iron, iridium, tungsten, gallium, lead, ruthenium, copper, cobalt, silicon and alloys thereof;
   (b) the ionic crystal semiconductor nanocrystal is selected from based on based on a material selected from perovskites, CdS, CdSe, CdTe, InP, InAs, ZnS, AlP, AlAs, AlSb, GaN, GaP, GaAs, InN, ZnSe, CuCl, Cu$_2$S, PbSe, PbS, PbTe, SnS, SnS$_2$, SnTe, and Bi$_2$Te$_3$; and
   (c) the metal oxide in the metal-oxide based nanocrystals is selected from oxides of iron, copper, zinc, uranium, bismuth, titanium, vanadium, nickel, silicon, and combinations thereof.

7. The process of claim 6 wherein the nanocrystals are independently associated with organic ligands comprising a hydrocarbon further modified with functional groups selected from carboxylic acid, amines, hydroxides, and thiol.

8. The process of claim 6 wherein the nanocrystals are independently associated with inorganic ligands selected from sulfides, phosphates, halogens, amides, hydroxides, selenide, phosphines, inorganic cluster, halide, and Nitrosonium tetrafluoroborate, wherein:
   (i) the inorganic cluster is selected from a group consisting of a metal chalcogenide and polyoxometalates; and
   (ii) the halide is selected from a group consisting of Cl, I, and Br.

9. The process of claim 8 wherein the powdery substance comprises from about 8% to about 0.1% by weight of the ligand associated nanocrystals.

10. The process of claim 9 wherein the powdery substance comprises from about 5% to about 0.1% by weight of the ligand associated nanocrystals.

11. The process of claim 10 wherein the powdery substance comprises from about 2% to about 0.1% by weight of the ligand associated nanocrystals.

12. The process of claim 11 wherein the powdery substance comprises from about 1% to about 0.5% by weight of the ligand associated nanocrystals.

13. The process of claim 12 wherein the nano particle-based material comprises a metal selected from gold, palladium, and silver.

14. The process of claim 13 wherein the nano particle-based material comprises a metal selected from gold, and palladium.

* * * * *